US011968490B2

(12) United States Patent
Møller et al.

(10) Patent No.: US 11,968,490 B2
(45) **Date of Patent: *Apr. 23, 2024**

(54) DOME FOR HEARING AIDS

(71) Applicant: Oticon A/S, Smørum (DK)

(72) Inventors: Kenneth Rueskov Møller, Vanløse (DK); Alexandru M. Simion, Smørum (DK)

(73) Assignee: Oticon A/S, Smørum (DK)

( * ) Notice: Subject to any disclaimer, the term of this patent is extended or adjusted under 35 U.S.C. 154(b) by 0 days.

This patent is subject to a terminal disclaimer.

(21) Appl. No.: 18/072,301

(22) Filed: Nov. 30, 2022

(65) Prior Publication Data

US 2023/0086864 A1 Mar. 23, 2023

Related U.S. Application Data

(63) Continuation of application No. 17/460,951, filed on Aug. 30, 2021, now Pat. No. 11,570,537.

(30) Foreign Application Priority Data

Aug. 31, 2020 (EP) .................................... 20193702

(51) Int. Cl.
*H04R 1/10* (2006.01)
*H04R 25/00* (2006.01)

(52) U.S. Cl.
CPC ........... *H04R 1/1016* (2013.01); *H04R 25/60* (2013.01); *H04R 25/654* (2013.01); *H04R 2460/11* (2013.01)

(58) Field of Classification Search
CPC .... H04R 1/1016; H04R 25/65; H04R 25/652; H04R 25/654; H04R 25/656; H04R 2225/77; H04R 2460/09; H04R 2460/11; H04R 2460/15
See application file for complete search history.

(56) References Cited

U.S. PATENT DOCUMENTS

| | | | | |
|---|---|---|---|---|
| 3,934,100 A * | 1/1976 | Harada | .................. | G10K 11/22 181/135 |
| 7,027,608 B2 * | 4/2006 | Fretz | ...................... | H04R 25/65 381/322 |
| 7,113,611 B2 * | 9/2006 | Leedom | ............... | H04R 25/652 381/328 |
| 8,116,495 B2 * | 2/2012 | Spaulding | ............ | H04R 25/656 381/328 |
| 8,165,332 B2 * | 4/2012 | Giese | ................... | H04R 25/656 381/328 |
| 8,175,308 B2 * | 5/2012 | Olsen | ................... | H04R 25/654 381/328 |
| 8,320,601 B2 * | 11/2012 | Takigawa | ............ | H04R 25/652 381/74 |

(Continued)

FOREIGN PATENT DOCUMENTS

| | | | |
|---|---|---|---|
| EP | 2 819 435 A1 | 12/2014 | |
| EP | 3817403 A1 * | 5/2021 | ........... H04R 25/654 |

*Primary Examiner* — Ryan Robinson
(74) *Attorney, Agent, or Firm* — Birch, Stewart, Kolasch & Birch, LLP

(57) ABSTRACT

The present disclosure relates to dome-type inserts, or simply domes, for a hearing aid. The dome is intended to be attached to a housing, such as an in-the-ear housing, and abut the ear canal. The dome-type insert comprises one or more vent channels for alleviating air pressure built-up and/or occlusion.

20 Claims, 3 Drawing Sheets

(56) References Cited

U.S. PATENT DOCUMENTS

| | | | | |
|---|---|---|---|---|
| 8,369,554 | B2 * | 2/2013 | Oberlander | H04R 25/652<br>381/328 |
| 8,503,707 | B2 * | 8/2013 | Urso | H04R 25/656<br>381/328 |
| 8,848,964 | B2 * | 9/2014 | Erdel | H04R 1/1058<br>381/373 |
| 9,185,504 | B2 * | 11/2015 | Shennib | H04R 25/652 |
| 9,277,336 | B2 * | 3/2016 | Møller | H04R 25/654 |
| 9,357,319 | B2 * | 5/2016 | Yoon | H04R 1/1041 |
| 9,906,880 | B2 * | 2/2018 | Van Doorn | H04R 25/656 |
| 10,334,375 | B2 * | 6/2019 | Naether | H04R 25/658 |
| 10,542,341 | B2 * | 1/2020 | Higgins | H04R 25/652 |
| 10,582,285 | B2 * | 3/2020 | Valenzuela | H04R 1/1016 |
| 10,652,644 | B2 * | 5/2020 | Bruss | H04R 1/1066 |
| 10,999,670 | B2 * | 5/2021 | Zalisk | H04R 1/1016 |
| 11,197,111 | B2 * | 12/2021 | de Ruijter | H04R 1/1016 |
| 11,218,819 | B2 * | 1/2022 | Junke | H04R 25/656 |
| 11,310,611 | B2 * | 4/2022 | Johnson | A61N 1/0526 |
| 11,381,897 | B2 * | 7/2022 | Ko | H04R 1/1058 |
| 2006/0291683 | A1 * | 12/2006 | Urso | H04R 25/654<br>381/328 |
| 2010/0166241 | A1 * | 7/2010 | Sabio | H04R 25/656<br>381/328 |
| 2010/0177919 | A1 | 7/2010 | Giese et al. | |

* cited by examiner

DOME FOR HEARING AIDS

CROSS REFERENCE TO RELATED APPLICATIONS

This application is a Continuation of co-pending application Ser. No. 17/460,951, filed on Aug. 30, 2021, which claims priority under 35 U.S.C. § 119(a) to European Patent Application No. EP 20193702.6 filed on Aug. 31, 2020. Each of the above applications is hereby expressly incorporated by reference, in its entirety, into the present application.

The present disclosure relates generally to a flexible insert mount, also termed dome, cap, ear tip or acoustic coupler. Especially the present disclosure relates to hearing aids comprising a flexible insert mount. Such a flexible insert mount generally has a core part and a dome-shaped part. Where the core part is configured to be mounted to an in-the-ear part, sometimes referred to as a receiver or speaker unit, and the dome-shaped part is configured to contact walls of an ear canal wherein the flexible insert mount is to be located. In the present disclosure the term dome is used for such a flexible insert mount. More particularly, the disclosure relates to domes having one or more venting channels. A dome, or acoustic coupler, is most often replaceable, or disposable after use, and acts as an interface between an output transducer to be placed in the ear canal of a hearing aid user and the ear canal wall. The dome traditionally has a core that fit or mate to a coupling part of the receiver and a thin interface that contact the ear canal.

One problem with positioning things in the ear canal of a person is the exposure to ear wax, i.e. cerumen, sweat and moisture. The ear canal produces wax (earwax), also known as cerumen, which serves as a natural lubricant for the ear canal. During use, hearing devices are in close contact with the user's ear, and thereby, hearing devices are exposed to the wax.

It is conventionally known that during use, the wax enters through an opening such as a sound outlet of the hearing device and advances through an interior channel in the cap or dome. For example, when inserting the dome of the hearing device into the user's ear canal, wax may be pressed into the dome until it reaches a wax filter right in front of an output unit of the hearing device, e.g. a speaker. At this point, the wax is trapped inside the hearing device. Over time, the wax accumulates inside openings in the dome and clogs the one or more channels and/or the wax filter in front of the output unit. Consequently, this leads to a deterioration of the sound output such as a reduced volume or a muffled tone. In some cases, users may consider hearing devices as malfunctioning due to the deterioration of sound or even return them for repair. In many cases, where the hearing devices are considered to be malfunctioning, the caps are clogged by wax and the function can be re-established by replacing the wax filter in front of the output unit.

Therefore, there is a need to provide a solution that allows for preventing customer complaints due to clogged hearing devices and to enhance the ease of use of the hearing device.

In addition to the above, domes may cause occlusion, that is, the experience of amplified voice when the user speaks. Some domes have venting holes made to minimize the occlusion effect but are still small enough to give the user sufficient low-frequency sounds for bass experience.

The present disclosure provides at least an alternative to the prior art.

SUMMARY

The present disclosure provides in an aspect a hearing device comprising a behind-the-ear housing and an in-the-ear speaker unit, wherein the in-the-ear speaker unit housing comprises a distal end having an interface for mounting and holding a dome-type insert. In an alternative, the hearing aid may be an in-the-ear hearing aid, where a distal portion is configured with an interface for mounting and holding the dome-type insert. The in-the-ear hearing aid may be Further, the in-the-ear part may comprise an opening for connecting a tube member extending from a behind-the-ear housing so as to allow an acoustic signal from an output transducer in the behind-the-ear housing to reach the ear canal of the wearer. Generally, the dome-type insert may comprise a core part configured to mate with the interface of the distal end of the speaker unit housing. This will allow the dome-type insert to connect to the mount and keep the dome-type insert in place during use. The interface allows the dome-type insert to be replaced, as the interface preferably provides a releasable mounting of the dome-type insert. The dome-type insert may further comprise a dome part, which may advantageously be formed by a flexible material. This is contemplated to allow for a relatively soft and compliant feel for the user when inserting the dome-type insert into the ear canal. In the dome-type insert, a vent may be formed by a first part and a second part. The first part may be part of the dome part, e.g. thereby constitute an outer part of the vent channel. The second part may be connected to, or extend from, the first part in an inward direction, thereby constituting an inner part of the vent channel. The first and the second parts may thereby create an opening. In such a configuration, the inner part, i.e. the second part, thereby extends inwardly from the dome-part towards the core part. The inner part or second part could therefor also be termed inwardly extending part. The second part, i.e. the inner part, of the vent may also provide some stiffness, or reinforcement, to the dome part so that the dome is less likely to collapse, either while mounted in the ear canal of the user, or during the insertion of the dome-type insert into the ear canal of the user. The inner part may be seen as being partly a reinforcement structure. Accordingly, the present disclosure provides an improved dome-type insert having a reduced risk of collapsing when being inserted into the ear canal than the prior art domes. The dome-type insert is intended and configured to be received wholly inside an auditory canal of a user.

The inner part and the outer part may have different radii, thereby forming a non-circular cross-section of the vent. The inner part may have a geometry different from semi-circular, such as at least a part of it being straight, the inner part may include a bent.

A sound outlet opening may be formed in the core part of the dome-type insert. The sound outlet may then allow sound to travel from the sound outlet towards the ear drum of the wearer while the dome-type insert and the in-the-ear housing is located in the ear canal of the user. When used in conjunction with an in-the-ear housing or in-the-ear hearing aid, the dome-type insert ma help retain the housing and/or hearing aid in the ear canal.

The through going bore or opening formed in the end of the dome part allow external sounds to pass through to the ear canal and reach the ear drum and also allows air to exit the small room or space between the dome-shaped part and the ear drum. In this way the dome provides relief for the pressure as well as reducing the occlusion experienced by the user. By having the inner part of the vent canal formed as explained above, the rim or lower part of the dome part does not easily collapse. Compared to domes where such a vent canal is formed near the tip, i.e. near the top or apex, the overall feel of the dome-type insert according to the present disclosure is more comfortable choose the user. The top or tip is intended to be orientated towards the eardrum and the other end of the dome-type insert is intended to be orientated towards the outer ear/pinna/ear canal opening.

Dome-type inserts according to the present disclosure may be supplied in sizes 6, 8 and 10 millimeters, which is considered appropriate for most users. This allow a hearing health care professional to select a dome-type insert with a size that fit the particular individual. Other sizes could be provided, but these are contemplated to provide a useful selection to the hearing health care.

A first length may be defined along the first part of the vent channel and a second length may be defined along an inner section, wherein the outer section is configured to abut the skin of the ear canal of the user during use, and the first length may be shorter than the second length. The outer section thereby establish a vent canal allowing air to pass through during the period of time where the dome-type insert is in the ear canal of the user.

The vent may be partially formed by an opened-faced inner part connected to the dome. This is contemplated to provide a more flexible and better fit with the ear canal as the ear canal of one individual user is different from the ear canal of another user. At least part of the interface between the open-faced inner part and the dome may be configured to abut the inner wall of the ear canal of the wearer when the dome-type insert is mounted in an ear canal. This may allow for establishing a higher fit rate, that is, allow the dome-type insert to be used for a larger group of users.

In a type-type insert according to the present disclosure, a dome length may be defined from a first dome end of the dome part, being at the peak, or apex, of the dome part, to a second dome end of the dome part, e.g. being the lower end or skirt of the dome, wherein the first section is defined in the area from the peak of the dome part to 25-75% of the dome length, such as 50%.

A first length may be defined along a midline of the first part of the vent channel and a second length may be defined along a midline of the second part, wherein the first length is shorter than the second length.

As an example, the first length and the second length may be defined along two parallel axis, such as wherein the first length and the second length may be defined along a respective axis being parallel with the center axis of the core part. The second length may be at least 1.5 times the first length.

At a bottom part of the dome, the inner part of the vent channel wall may create a radially directed force so that the dome is less likely to collapse during an insertion operation into the ear canal. This is contemplated to provide a dome-type insert that is less likely to collapse during insertion and/or during use. By providing more stiffness to the lower part of the dome part, while allowing the tip or top part to remain (relatively more) soft, a more comfortable dome-type insert is achieved. Also, such a construction is contemplated to allow an overall reduction of use of material.

Advantageously, at a cross section between 30% and 70% of the height of the dome-type insert, the vent channel may be defined in at least 50% of the circumference of the dome part. Advantageously, the vent opening may be positioned at the bottom part of the dome and extend towards the tip of the dome.

Advantageously, the outer part of the vent may extend for less than 10% of the second length, and when inserted into the ear canal, at least part of the vent may be defined between the inner portion of the vent and at least part of the ear canal of the user.

Advantageously, the core part and the dome part may be made from the same material, or alternatively, wherein the core part and the dome part are made from different materials, such as wherein at least the dome is made from a silicone material, such as a medical grade silicone material, such as flexan. When using the same material for all parts, a single step operation/casting may be utilized. This may include the core part and the dome part being formed integrally in one casting operation.

A first wax filtering element comprising a sound outlet may be included. Such a first wax filtering element may be protruding from the dome-shaped part and being arranged to bridge the sound outlet opening formed in the core part. Including a wax filter of this type is contemplated to provide a more comfortable dome for the user, while providing an enhanced protection against wax ingress.

Advantageously, a second wax filtering element at least partially protruding from the dome part may be provided, such a second wax filtering element may be arranged in or at a sound outlet port. Adding an additional, i.e. a second, wax filter may provide an even more advanced was protection.

Advantageously, a second wax filtering element may be at least partially protruding into a space between the first wax filtering element and the dome part.

The present disclosure relates generally to a dome-type insert for a hearing aid. Wherein the dome-type insert may comprise a core part configured to mate with an interface of a distal end of a housing of the hearing aid, wherein a sound outlet opening is formed in the core part. The dome-type insert may further comprise a dome part formed by a flexible material and extending from the core part, wherein a vent may be formed in the dome part by a first part, being part of the dome part, and a second, inner part connected to the first part so as to create an opening, wherein the inner part extends inwardly from the dome-part towards the core part.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
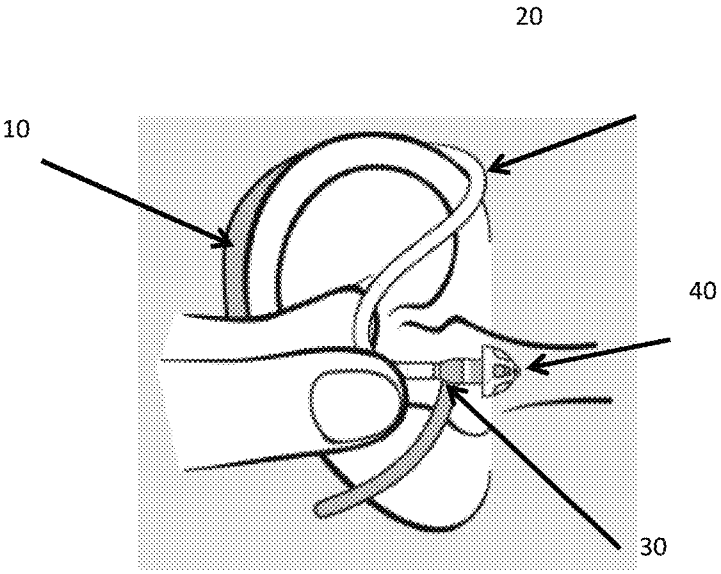
FIG. 1 schematically illustrates a hearing aid at an ear of a user.

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing device (or hearing instrument, hearing assistance device) may be or include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. 'Improving or augmenting the hearing capability of a user' may include compensating for an individual user's specific hearing loss. The "hearing device" may further refer to a device such as a hearable, an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of the middle ear of the user or electric signals transferred directly or indirectly to the cochlear nerve and/or to the auditory cortex of the user.

The hearing device is adapted to be worn in any known way. This may include i) arranging a unit of the hearing device behind the ear with a tube leading air-borne acoustic signals into the ear canal or with a receiver/loudspeaker arranged close to or in the ear canal and connected by conductive wires (or wirelessly) to the unit behind the ear, such as in a Behind-the-Ear type hearing aid, and/or ii) arranging the hearing device entirely or partly in the pinna and/or in the ear canal of the user such as in an In-the-Ear type hearing aid or In-the-Canal/Completely-in-Canal type hearing aid, or iii) arranging a unit of the hearing device attached to a fixture implanted into the skull bone such as in a Bone Anchored Hearing Aid or a Cochlear Implant, or iv) arranging a unit of the hearing device as an entirely or partly implanted unit such as in a Bone Anchored Hearing Aid or a Cochlear Implant. The hearing device may be implemented in one single unit (housing) or in a number of units individually connected to each other.

A "hearing system" refers to a system comprising one or two hearing devices, and a "binaural hearing system" refers to a system comprising two hearing devices where the devices are adapted to cooperatively provide audible signals to both of the user's ears. The hearing system or binaural hearing system may further include one or more auxiliary device(s) that communicates with at least one hearing device, the auxiliary device affecting the operation of the hearing devices and/or benefitting from the functioning of the hearing devices. A wired or wireless communication link between the at least one hearing device and the auxiliary device is established that allows for exchanging information (e.g. control and status signals, possibly audio signals) between the at least one hearing device and the auxiliary device. Such auxiliary devices may include at least one of a remote control, a remote microphone, an audio gateway device, a wireless communication device, e.g. a mobile phone (such as a smartphone) or a tablet or another device, e.g. comprising a graphical interface, a public-address system, a car audio system or a music player, or a combination thereof. The audio gateway may be adapted to receive a multitude of audio signals such as from an entertainment device like a TV or a music player, a telephone apparatus like a mobile telephone or a computer, e.g. a PC. The auxiliary device may further be adapted to (e.g. allow a user to) select and/or combine an appropriate one of the received audio signals (or combination of signals) for transmission to the at least one hearing device. The remote control is adapted to control functionality and/or operation of the at least one hearing device. The function of the remote control may be implemented in a smartphone or other (e.g. portable) electronic device, the smartphone/electronic device possibly running an application (APP) that controls functionality of the at least one hearing device.

In general, a hearing device includes i) an input unit such as a microphone for receiving an acoustic signal from a user's surroundings and providing a corresponding input audio signal, and/or ii) a receiving unit for electronically receiving an input audio signal. The hearing device further includes a signal processing unit for processing the input audio signal and an output unit for providing an audible signal to the user in dependence on the processed audio signal.

FIG. 1 schematically illustrate a hearing aid 10 having a behind the ear housing 20, where a dome-type insert 40 is mounted on an in-the-ear housing 30, here comprising an output transducer for delivering sound to the ear canal of the user. The main housing of the hearing aid 10 is placed behind the ear of the user and a connecting member 50 mechanically connects the behind-the-ear housing 20 with the in-the-ear housing 30. When mounted at the ear of the user or wearer, the connecting member 50 extends from the area where the pinna connects to the user's head and is configured to (at least to some degree) follow part of the pinna so as to enter the ear canal of the user in an inconspicuous way. In other variants, the output transducer is placed in the behind-the-ear housing and the connecting member 50 comprises a hollow canal that guides sound from the behind-the-ear housing to the in-the-ear housing wherefrom the sound is provided into the ear canal of the user. The connecting member 50 is generally flexible, but may provide some resilience so that the user may insert the in the ear housing into the ear canal while hosing on to part of the connecting member 50.

The in-the-ear housing is provided with a dome-type insert in order to provide some retention force so that the in-the-ear housing does not fall out of the ear canal during use, and also to provide some level of comfortable feeling while the in-the-ear housing is mounted in the ear canal.

Figure 2:
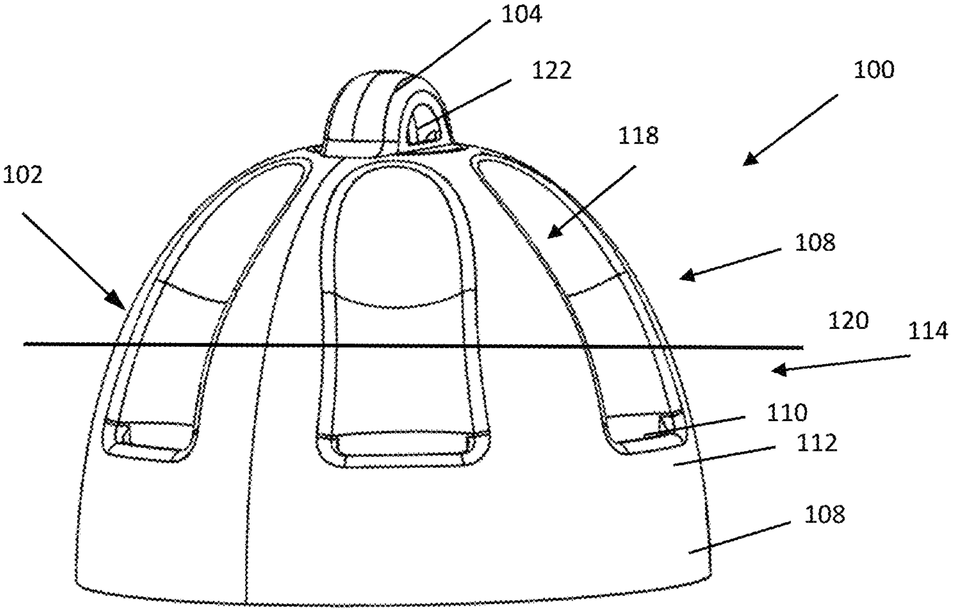
FIG. 2 schematically illustrates a dome-type insert in a side view.
Figure 3:
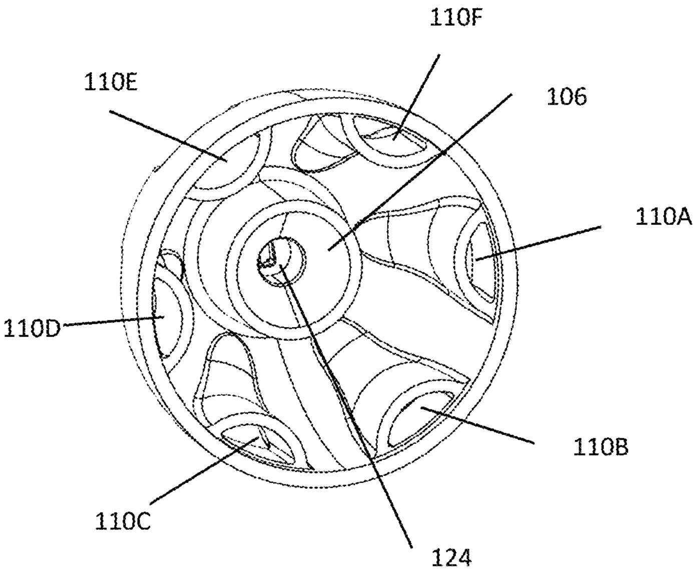
FIG. 3 schematically illustrates a dome-type insert seen from below or back, FIG. 4 schematically illustrates a dome-type insert seen from top or front, and FIG. 5 schematically illustrates a cut-through view of a dome-type insert.

Generally, the dome-type insert 100, or simply dome, comprises a dome part 102 shown in some detail in FIG. 2, and a core part 106, shown in more detail in FIG. 3.

In FIG. 1, the hearing aid system the behind-the-ear housing comprises an input system for converting acoustical signals from the user's surroundings into electrical signals. The behind-the-ear housing further comprises a signal processor for processing the electrical signals into processed electrical signals. The processing may include one or more operations intended to create a signal that is intended to compensate for the user's specific hearing loss, such as amplification, frequency transposition, dampening, or the like. The processed electrical signal is then transmitted or transferred to an output device located in the in-the-ear part, often termed a receiver. The output transducer converts the processed signal into an acoustical signal that is transferred to the user's ear canal, and thus eventually to the user's ear drum.

The core part 106, not visible in FIG. 2 but seen e.g. in FIG. 3, is configured, or adapted, to mate with an interface part of the in-the-ear housing. The interface part may include a snap fitting to create a suitable retention force so that the dome-type insert is not easily released and unintentionally left in the ear canal of the user, either during extraction or but a mistake as the hearing aid falls off the ear. Other types of retention may be established, such as press-fitting etc.

The core part 106 comprises a central opening so as to allow sound to pass from the output transducer and into the ear canal of the user during use. The core part 106 is configured with an interface for attachment to an outlet port of an in-the-ear housing with speaker, often termed a speaker unit. The core part 106 may be configured to be attached to an in-the-ear hearing aid housing, such as a hearing aid that is configured to be, at least partially, in the ear canal of a user. One or more arrangements for trapping ear wax, i.e. cerumen, may be included at the core opening or at least in the core canal 124.

Generally, dome-type inserts have venting holes or channels, which may help to minimize occlusion in ear canal while still being small enough to allow low frequency sounds to pass for improving bass experience for the wearer/user.

Venting channels may be created at the front of the dome, i.e. the part closest to the ear drum when mounted in the ear canal, but such vent holes may easily be clogged by earwax when the dome is inserted into the ear canal or during use. When the vent is getting clogged the dome vent response will change and the user will feel occlusion effect which will lead to bad experience. Also, and maybe more importantly, the present inventors have found that positioning vent canals near the peak of the dome may lead to a more ridged dome, which users may find uncomfortable.

A venting channel, or simply vent, has a certain section area combined with a certain length. The combination of section area and length determine the prescribed vent for the user. As the thickness of the dome part is normally relatively thin to obtain comfort in the ear canal, e.g. 0.5 mm thick, the section area of the vent needs to be very small to compensated for the short length. However, the small vent holes often clog due to ingress of wax, but the relatively small holes are challenging to make in e.g. a silicone molding tool since the cores used for making the holes will be very fragile. To increase the vent length, there is a need to add extra material to reinforce the vent. This extra material makes the dome less flexible in the ear canal which is important especially in the front of the dome which is the part that reaches deepest into the ear canal.

In the dome-type insert 100 according to the present description, a minimum of material is used in the dome itself, and the distance from the actual vent to the core part is relatively large, which provides a soft feel of the dome and a reduced material use.

The hearing aid 10 in FIG. 1 also comprises a retention member 60 configured so that when the hearing aid 10 is mounted on/at the ear, the retention member 60 is arranged in the concha bowl and abut the wall of the pinna so that the speaker/in-the-ear housing 30 is better retained in the ear canal. Also, the retention member 60 may be used to extract the in-the-ear housing with the dome-type insert 40 from the ear canal.

FIG. 2 is a schematic side view of a dome-type insert 100. As illustrated in connection with FIG. 1, the dome-type insert 100 is configured to be attached to an outlet section of a speaker unit, here the speaker unit is also termed in-the-ear housing. Not illustrated in FIG. 2 but visible in e.g. in FIG. 3, a core part 106 is configured to attach to the speaker unit/in-the-ear housing. In the present case, the in-the-ear housing is an instant fit, meaning that the housing itself has not been specifically adapted or configured to the user's individual ear canal, in other cases, the dome-type insert 100 may be attached to a custom shaped housing, where the custom shaped housing has been formed according to the specific shape and geometry of the ear canal of the intended user.

In FIG. 3, six vent channels 110A-110F are illustrated. The vent channels 110A-110F are here distributed evenly along the periphery of the lower part of the dome-type insert.

At one end, here the peak or tip, of the dome-type insert 100, a wax guard 104 is formed. Here the wax guard is in the shape of protruding bridge 104, however, other types of wax guard may be used, such as an insert filter, a labyrinth, or the like. The protruding bridge 104 has a sound opening 112 allowing sound to enter the ear canal of the person wearing the hearing aid with the dome-type insert 100.

In FIG. 2, the outer surface of the dome-type insert 100 is a dome part 102. The dome part 102 extends from the peak of the dome-type insert 100, that is, from the area around or at the sound outlet 122, and illustrated as extending downwardly therefrom. Overall, the dome-type insert 100 has a parabolically-like shaped outer contour. This is contemplated to allow for a smoother insertion into an ear canal of a user.

As seen in FIG. 2, an inwardly extending part 118 of the vent canal extends to create a canal when the dome-type insert 100 is inserted into an ear canal of a user, by establishing a distance between the inwardly extending part 118 and the ear canal. It is contemplated that the ear canal will be, at least partly, abutted by the areas of the dome part 102 between each of the inwardly extending parts, in FIG. 2 three of such parts is shown.

The dome part of dome-type insert 100 is formed by a flexible material. Suitable materials include medical grade silicone or the like material suitable for contact with the skin. The dome-type insert 100 is preferably formed from a single type of material for a more simple production, but may alternatively be formed by 2K molding, e.g. to obtain specific properties of the core part or the dome part.

FIG. 3 schematically illustrates the dome-type insert 100 seen from the bottom, so as to illustrate the inside of the dome-type insert 100. Here the core part 106 is visible. The core part 106 is configured with an interface so that a mechanical connection between the dome-type insert 100 and the in-the-ear housing 30 may be established. The core part 106 is shorter than the overall length or height of the dome-type insert 100, which is clear when viewing FIG. 2 where the core part 106 does not extend beyond the lower part of the dome part 102. As is also illustrated in FIG. 3 are the six vent canals, denoted 110A-110F. Measured at the dome part 102 at the lower opening, the width of the vent canals 110A-F takes up between ⅓ and ⅔ of the entire circumference measured along the inner edge of the dome part 102. The width of a vent canal 110A-110F is dependent on the size of the dome-type insert, smaller vents for smaller dome-type inserts. This is presently preferred over varying the number of vents, however having a fixed vent size for a range of dome-type insert sizes is possible, so that for a given size of dome-type insert 100 a certain number of vent canals is formed. E.g. in a smaller dome-type insert only 5 vent canals are formed, whereas in a larger dome-type insert 8 vent canals (with similar or identical size) are formed.

Figure 4:
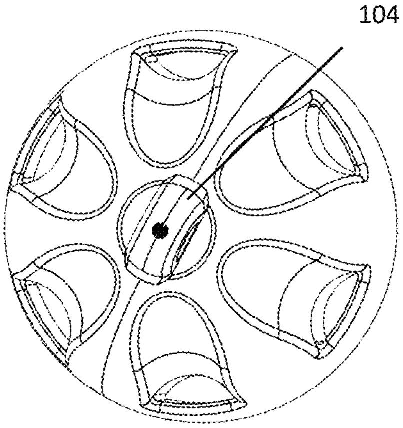

Conceptually, as illustrated by the separation line 120 in FIG. 2, the dome part 102 can be seen as having a first section 108 connected to the core part 106, and a second section 114 extending from the first section 108. A mid-section may be defined between the first 108 and second section 114. In an unloaded state, the lowest part, or end/skirt part, of the second section 114 has a circular contour, as is seen in FIGS. 3 and 4. The dome-type insert 102 comprises a vent canal 110 formed by two parts, namely a first vent part 112 being part of the dome part 102, and a second vent part. As illustrated in FIG. 2, the first vent part 112 is constituted by a part of the dome part 102, i.e. the part of the dome-type insert 100 configured to abut the ear canal when the dome-type insert 100 is mounted in an ear canal. The second part 114 of the vent canal 110 is an inner part, which is connected to the first vent part 112 so that the opening formed between the first vent part 112 and the second vent part form a part of a vent opening. Further, the inner part extends from the dome-part towards the core part.

At the peak of the dome-type insert 100, a bore or channel 116 is formed. As is seen in FIG. 3 and FIG. 4, the bore 116 is a through-going bore or channel that, when the dome-type insert 100 is attached to the in-the-ear housing 30, allow sound to be transmitted from the speaker towards the eardrum of the user. The opening 116 ends at the sound outlet 122.

As is also seen in the figures, each vent 110A-F comprises a first vent part being an uncovered, or exposed, part. This is the part that is seen e.g. in FIG. 2 as the half-canal shaped part that extend in the length direction, here up-down, of the dome-type insert 100. The vent canal 110A-F comprises a second vent part being a covered vent part, which is the part of the vent canal 110A-F where the outer wall of the dome covers a part of the vent canal. During use, at least part of the first vent part is configured to abut a wall of the ear canal of the user. In this way, the inwardly extending part creates a canal where part of that canal is the ear canal wall and the other part is a part of the first vent part.

The tip, or apex of the dome-type insert 100 at the bridge 104, is intended to be the part that is first inserted into the ear canal when the in-the-ear part of the hearing aid 10 is mounted in the ear canal, whereas the opposite end of the type-type insert is intended to be oriented towards the outer ear when inserted into the ear canal. The filter part, here a bridge 104, is intended to reduce the risk of the opening being clogged by cerumen, and/or other dirt particle entering the opening. The entire height, i.e. the axial distance from a plane perpendicular to the opening end to a plane defined by the lower part of the dome-type insert 100, of the device is often in the range of 5-15 mm.

The vent as such may be defined as the canal going from the bottom part of the dome and as the outer part of the vent, i.e. here a part of the dome, and an inner surface part, which extends inwardly from the dome towards the core part. The outer part extends a first distance measured in the axial direction basically relative to the core part. The inner part extends a second distance, also measured in the axial direction basically relative to the core part. As is seen in the figure, the outer part is shorter than the inner part, and thus a sub-part of the inner part is exposed for the part not being covered by the outer part. When mounted in the ear canal, at least part of this exposed part will abut the ear canal wall, and owing to the curvature of the inner part, there is still an air permeable canal formed, which at least partially alleviate occlusion. The opening also ensures, at least partially, that, during insertion, air pressure is not built up too much during insertion, or reduced during removal, or at least that pressure faster reaches a normalized lever over a period of time afterwards. Both the pressure build-up during insertion and the lowering of the pressure could create an uncomfortable experience for the user.

By having a section of the vent that is not covered by an external surface, i.e. has the internal surface exposed as described above, also reduce the risk of the channel collapsing, e.g. due to folding or creases in the dome due to shape of the ear canal or being clogged by wax and/or debris.

The outer wall, i.e. the first vent part 112, could be seen as acting as a bridge between two opposite sides of the inner surface, where the outer wall bridge help maintain the vent channel open, even when the dome is pressed by the ear canal, which could increase the risk of the dome being folded in the area where in vent is formed.

FIG. 4 schematically illustrates a dome-type insert 100 seen from the front or top. The bridge 104 extends over the opening of the core opening 124 so as to act as a wax guard.

Figure 5:
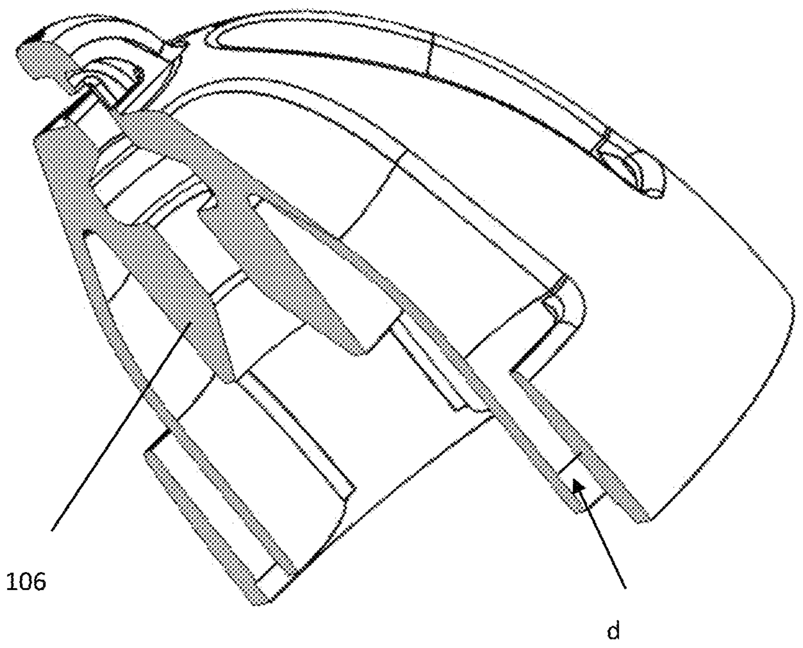

FIG. 5 schematically illustrates a cut-through view of a dome-type insert 110. As is seen in this figure, the core canal includes a structure configured to attach to an outlet port of a speak so as to hold the dome-type insert in the intended position in the ear canal during use. Also seen here is the distance, d, between the outer part of the vent canal and the inner part. The distance is not constant along the width of the vent canal, which is also seen by the contours better seen in FIG. 3.

The bridge 104 includes a small, narrow protrusion dividing the space underneath the bridge 104. This protrusion is also contemplated to help reduce the ingress of ear wax and other debris from the ear canal.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled”

to another element, it can be directly connected or coupled to the other element, but an intervening element may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method are not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

The invention claimed is:

1. A dome-type insert for use with a hearing device having a behind-the-ear housing and an in-the-ear speaker unit, a housing of the in-the-ear speaker unit including a distal end having an interface for mounting and holding the dome-type insert, the dome-type insert comprising:

- a core part configured to mate with the interface of the distal end of the speaker unit housing, wherein a sound outlet opening is formed in the core part;
- a dome part formed by a flexible material, the dome part having a first section connecting to the core part and a second section extending from the first section; and
- a vent canal formed by a first vent part being part of the dome part in at least part of the second section and a second vent part being an inner part connected to the first vent part so that an opening formed between the first vent part and the second vent part form a part of a vent opening, wherein the inner part extends from the dome-part towards the core part.

2. The dome-type insert according to claim 1, wherein a dome length is defined from a first dome end of the dome part, being at the peak of the dome part, to a second dome end of the dome part, wherein the first section is defined in the area from the peak of the dome part to 25-75% of the dome length.

3. The dome-type insert according to claim 1, wherein a first length is defined along a midline of the first vent part of the vent canal and a second length is defined along a midline of the second vent part, wherein the first length is shorter than the second length.

4. The dome-type insert according to claim 3, wherein the first length and the second length being defined along two parallel axis, such as wherein the first length and the second length being defined along a respective axis being parallel with the center axis of the core part.

5. The dome-type insert according to claim 3, wherein the second length is at least 1.5 times the first length.

6. The dome-type insert according to claim 1, wherein a part of the vent is formed by an opened-faced inner part connected to the dome, wherein at least part of the interface between the open-faced inner part and the part of the dome configured to abut the inner wall of the ear canal of the wearer when the dome-type insert is mounted in an ear canal.

7. The dome-type insert according to claim 1, wherein at a bottom part of the dome, the inner part of the vent channel wall creates a radially directed force so that the dome is less likely to collapse during an insertion operation into the ear canal.

8. The dome-type insert according to claim 1, wherein, at a cross section between 30% and 70% of the height of the dome-type insert, the vent canal is defined in at least 50% of the circumference of the dome part.

9. The dome-type insert to claim 1, wherein the vent opening is positioned at the bottom part of the dome and extends towards the tip of the dome.

10. The dome-type insert according to claim 1, wherein the outer part of the vent extends for less than 10% of the second length, and when inserted into the ear canal, at least part of the vent is defined between the inner portion of the vent and at least part of the ear canal of the user.

11. The dome-type insert according to claim 1, wherein the core part and the dome part are made from the same material, or alternatively, wherein the core part and the dome part are made from different materials, at least the dome is made from a silicone material, such as a medical grade silicone material, such as flexan.

12. The dome-type insert according to claim 1, wherein the core part and the dome part are formed integrally in one casting operation.

13. The dome-type insert according to claim 1, further comprising:

- a first wax filtering element comprising a sound outlet, the first wax filtering element protruding from the dome-shaped part and being arranged to bridge the sound outlet opening formed in the core part.

14. The dome-type insert according to claim 1, further comprising a second wax filtering element at least partially protruding from the dome part and arranged in the sound outlet port.

15. The dome-type insert according to claim 14, wherein the second wax filtering element at least partially protruding into a space between the first wax filtering element and the dome part.

16. The dome-type insert according to claim 2, wherein a first length is defined along a midline of the first vent part of the vent canal and a second length is defined along a midline of the second vent part, wherein the first length is shorter than the second length.

17. The dome-type insert according to claim 4, wherein the second length is at least 1.5 times the first length.

18. The dome-type insert according to claim 2, wherein a part of the vent is formed by an opened-faced inner part connected to the dome, wherein at least part of the interface between the open-faced inner part and the part of the dome configured to abut the inner wall of the ear canal of the wearer when the dome-type insert is mounted in an ear canal.

19. The dome-type insert according to claim 3, wherein a part of the vent is formed by an opened-faced inner part connected to the dome, wherein at least part of the interface between the open-faced inner part and the part of the dome configured to abut the inner wall of the ear canal of the wearer when the dome-type insert is mounted in an ear canal.

20. The dome-type insert according to claim 4, wherein a part of the vent is formed by an opened-faced inner part connected to the dome, wherein at least part of the interface between the open-faced inner part and the part of the dome configured to abut the inner wall of the ear canal of the wearer when the dome-type insert is mounted in an ear canal.

* * * * *